(12) United States Patent
Roseberry et al.

(10) Patent No.: US 8,033,386 B2
(45) Date of Patent: Oct. 11, 2011

(54) SKIRTBOARD APPARATUS, SYSTEM AND METHOD

(75) Inventors: Jerry A. Roseberry, Ona, WV (US); Blaine R. Stoll, Chesapeake, OH (US)

(73) Assignee: Richwood Industries, Huntington, WV (US)

( * ) Notice: Subject to any disclaimer, the term of this patent is extended or adjusted under 35 U.S.C. 154(b) by 0 days.

(21) Appl. No.: 12/061,016

(22) Filed: Apr. 2, 2008

(65) Prior Publication Data

US 2009/0250323 A1 Oct. 8, 2009

(51) Int. Cl.
*B65G 15/00* (2006.01)
*B65G 17/00* (2006.01)
*B65G 21/20* (2006.01)
(52) U.S. Cl. ............... 198/836.1; 198/836.3; 198/836.4
(58) Field of Classification Search ............. 198/836.1, 198/836.3, 836.4
See application file for complete search history.

(56) References Cited

U.S. PATENT DOCUMENTS

| 3,954,694 A * | 5/1976 | Hallstrom et al. ............ 523/457 |
| 6,257,390 B1 * | 7/2001 | Tehrani .......................... 198/326 |
| 6,763,935 B2 * | 7/2004 | Ostman ....................... 198/836.1 |
| 2009/0026047 A1 * | 1/2009 | Bowman .................... 198/836.1 |

* cited by examiner

*Primary Examiner* — Gene Crawford
*Assistant Examiner* — Yolanda Cumbess
(74) *Attorney, Agent, or Firm* — Waters Law Group; Robert R. Waters; Brian W. Foxworthy

(57) ABSTRACT

A skirtboard system for a conveyor belt or line comprising at least two skirtboards mutually opposed to one another. Each one of the skirtboards is positioned near the perimeter of the conveyor. Each one of the skirtboards comprises a support plate, a plurality of elements, each one of the elements mutually coupled with the support plate, a liner formed in interstices between the plurality of elements, a beveled nose formed along an edge of the skirtboard panel, the beveled nose complementary to the angle of the conveyor.

19 Claims, 4 Drawing Sheets

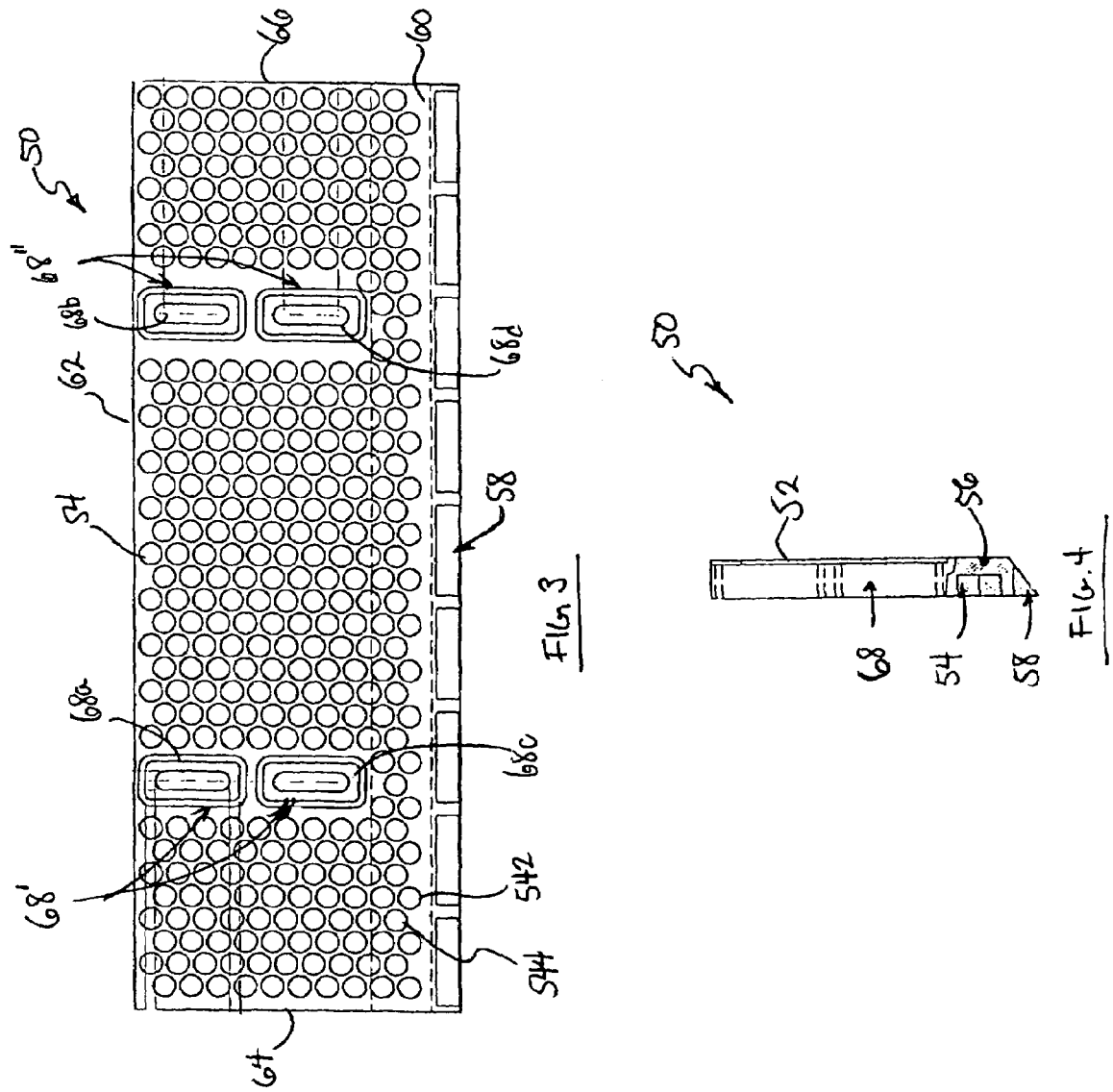

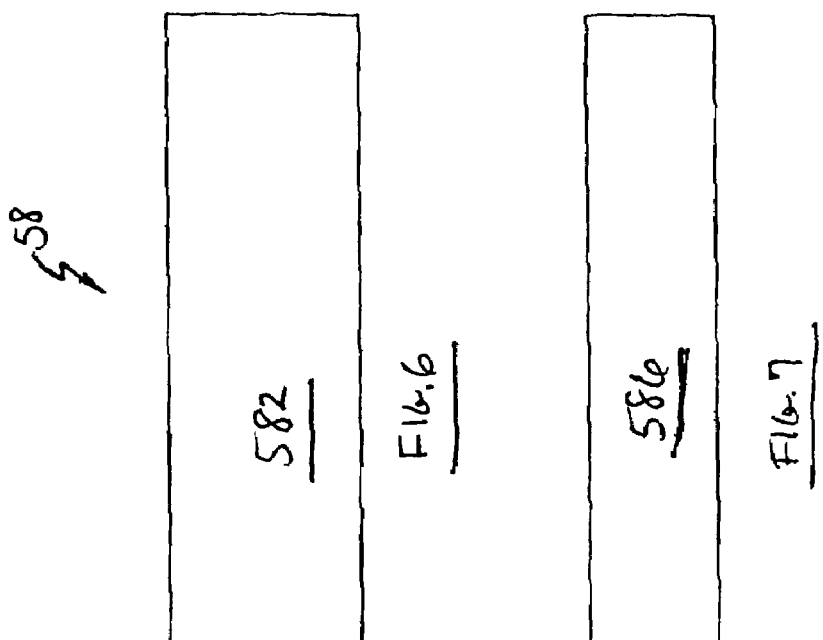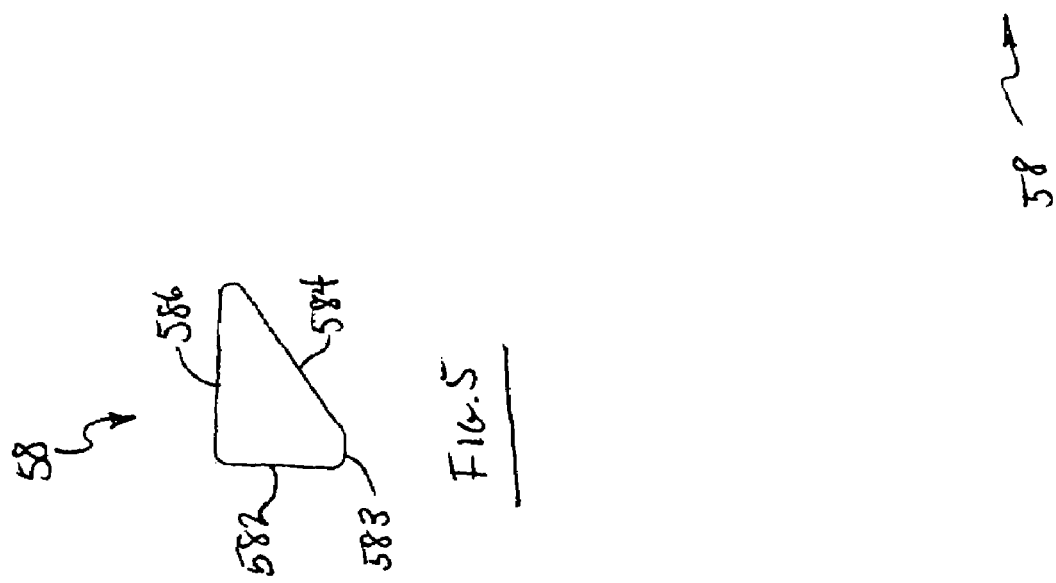

SKIRTBOARD APPARATUS, SYSTEM AND METHOD

FIELD OF INVENTION

This application discloses claims and embodiments generally related to a skirtboard for a conveyor, and more particularly, a skirtboard apparatus and system for a conveyor, and a method of manufacturing a skirtboard apparatus, wherein each skirtboard has ceramic elements incorporated in the individual skirtboards minimizing spillage and loss of material from the conveyor.

BACKGROUND OF THE INVENTION

In material handling, many materials are transported or conveyed along a conveyor line or belt, such as in the coal mining industry or mail or package handling facilities. Given the limited space in such settings, economizing the footprint of a conveyor line is essential, thus, conveyor lines usually are limited to a defined width. Without skirtboards aligned along the sides of the conveyor, material would bound or fall from the conveyor line, which could result in processing inefficiencies and other undesirable consequences, such as blocking ingress and egress of workers or machines. Thus, it is desirable for a conveyor line to include a skirtboard system comprising a plurality of individual skirtboard panels. The skirtboard panels are stationary panels mounted above the conveyor belt, arranged in a laterally adjacent configuration to form a functional channel for the materials transported along the belt. Thus, it is advantageous to have an apparatus or device having the elements and features disclosed herein.

Several products and inventions have been proposed in order to achieve these goals. The art includes many such attempts and improvements. However, the art does not appear to disclose the combination of elements and features disclosed herein, including the novel combination of elements and/or materials disclosed hereinafter. In particular, the art includes several skirtboards that utilize a rubber or synthetic wear-liner. Significantly, rubber wear-liners are subject to quick exhaustion, as the material batters the rubber material repeatedly over the course of transportation. The exhaustion rate is exacerbated by the rubber materials susceptibility to chipping and failure as the materials becomes thinner, especially along the bottom edge of the wear-liner. As such, an improvement to the wear-liners and skirtboards presently available is desirable and useful.

This application presents claims and embodiments that fulfill a need or needs not yet satisfied by the products and inventions previously or presently available, including the example of the art presented above. In particular, the claims and embodiments disclosed herein describe a skirtboard system and skirtboard panels comprising the system that provide an unanticipated and nonobvious combination of features distinguished from the products and inventions preexisting in the art, including combinations of materials used for reinforcing the wear-liner of the skirtboard, extending the useful life of the skirtboard and minimizing down-time for replacement or repair. A beveled nose is incorporated into each skirtboard, thereby sealing the surface at the belt interface, inhibiting or preventing the escape of dust and smaller particles into the area around the conveyor, and further inhibiting or preventing spillage of materials. Although not exhaustive, controlling, reducing and minimizing spillage of materials (i) reduces the loss of material production during transport, (ii) reduces the build-up of material on the conveyor structure and its attendant components, thereby reducing the likelihood of damage or early fatigue or exhaustion of the conveyor or components; (iii) improves safety by reducing obstructions in the walkways and improving access to the conveyor; and (iv) improves the environment in and around the conveyor, and especially inhibits the build-up of material on the ground below the conveyor. The claims and embodiments disclosed herein reduce the spillage of materials, and therefore, achieve some or all of the aforementioned results. The applicant is unaware of any product, disclosure or reference that disclose the features of the claims and embodiments disclosed herein, and as more dully described below.

SUMMARY OF THE INVENTION

In accordance with one embodiment, a skirtboard panel for a conveyor is described, the skirtboard comprising a support plate, a plurality of elements, each one of the elements mutually coupled with the support plate, a liner formed in interstices between the plurality of elements, and a beveled nose formed along an edge of the skirtboard panel, the beveled nose complementary to the angle of the conveyor.

In accordance with another embodiment, a skirtboard system for a conveyor is described, the system comprising at least two skirtboards mutually opposed to one another, each one of the skirtboards positioned near the perimeter of the conveyor. Each one of the skirtboards comprising a support plate, a plurality of elements, each one of the elements mutually coupled with the support plate, a liner formed in interstices between the plurality of elements, a beveled nose formed along an edge of the skirtboard panel, the beveled nose complementary to the angle of the conveyor.

In accordance with another embodiment, a method for making a skirtboard panel is described, the method comprising the steps of forming at least one aperture in a support plate, coupling a plurality of elements with the support plate, coupling a beveled nose to an edge of the support plate, and forming a liner in the interstices between the plurality of elements.

In each of the embodiments described above, and for other embodiments not specifically described but contemplated and/or within the scope of the descriptions herein, the support plate comprises a rigid material. It is envisioned that each one of the plurality of elements comprises abrasion-resistant material. It is envisioned that each one of the plurality of elements comprises a ceramic material. Additional, the liner may comprise a rubber material. It is envisioned that the profile of the liner may comprise a greater depth than the profile of the elements. It is also envisioned that the beveled nose may comprise a ceramic material.

In each of the embodiments described above, and for other embodiments not specifically described but contemplated and/or within the scope of the descriptions herein, each skirtboard panel may further comprise at least one aperture for receiving a mounting clamp assembly utilized for mounting the skirtboard panel into position. Additionally, and in another embodiment, each skirtboard panel may further comprise a pair of apertures in spaced-apart relationship, each one of the apertures for receiving a separate mounting clamp assembly utilized for mounting the skirtboard panel into position. In another embodiment, each skirtboard panel may further comprise a first pair of apertures and a second pair of apertures, the first pair of apertures in spaced-apart relationship with the second pair of apertures, the first pair of apertures comprising a pair of apertures vertically adjacent, the second pair of apertures comprising a pair of apertures vertically adjacent.

BRIEF DESCRIPTION OF THE DRAWINGS

FIG. 3 is front view of one of the panels of the system;

FIG. 4 is a side view of FIG. 3;

FIG. 5 is a side view of a beveled nose of the panel;

FIG. 6 is a top view of the nose; and

FIG. 7 is a front view of the nose.

DESCRIPTION OF THE EMBODIMENTS

Generally, a skirtboard system is used in conjunction with conveyor lines such that the system is aligned along or near the lateral perimeter of the conveyor line and utilized to prevent bulk materials from overcrowding the conveyor and/or spilling over the sides of the conveyor line during transport or unloading. The skirtboard system 10 and skirtboard panels 50 comprising the system 10 disclosed herein extend the useful-life of the panels 50 and system 10, and reduce the down-time required to remove an exhausted panel and install a new panel.

With reference to the figures, specifically FIG. 1 through FIG. 7, a skirtboard system 10 comprising a plurality of skirtboard panels 50 is disclosed, in addition to a method of making each individual skirtboard panel 50.

Figure 1:
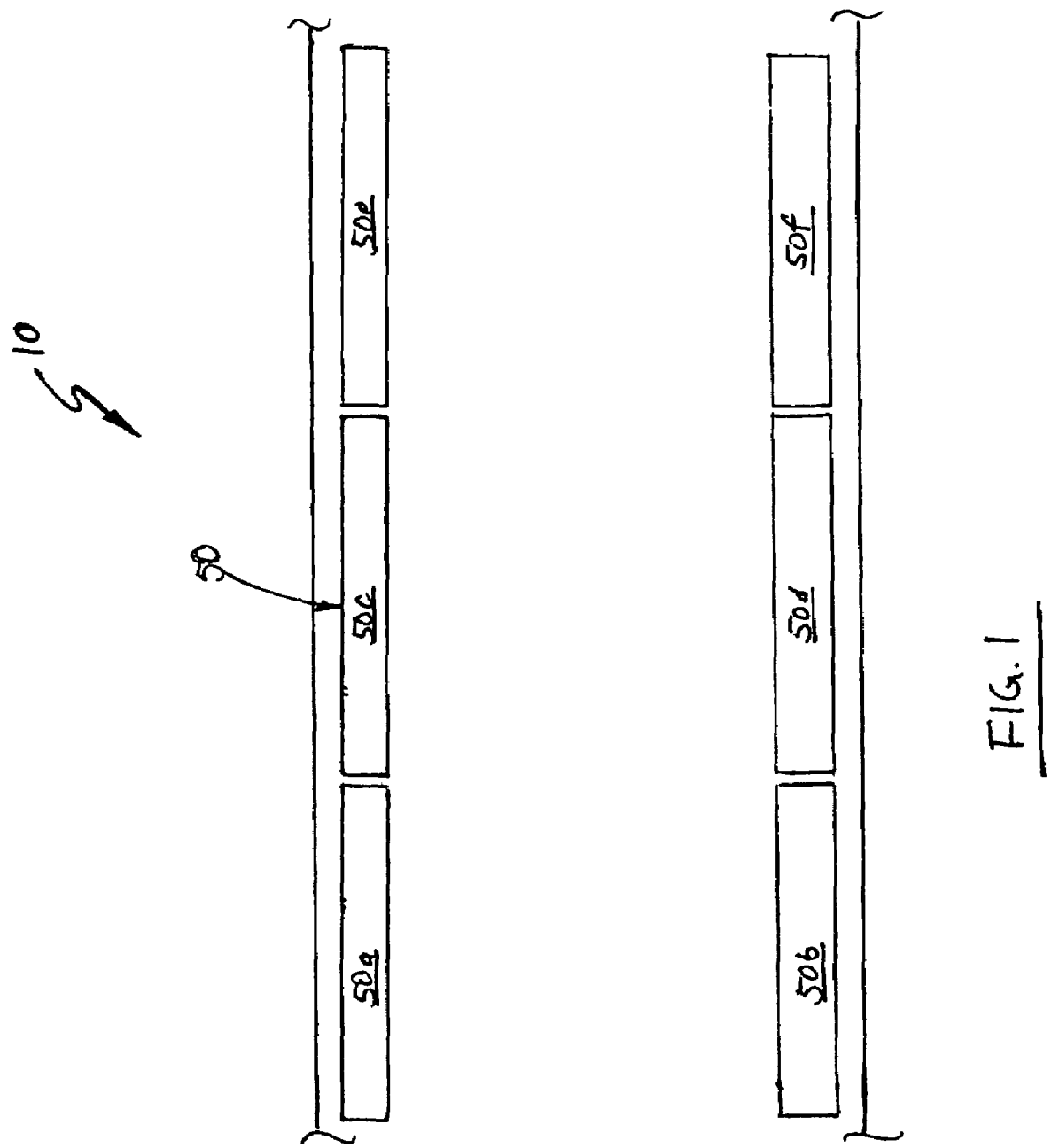
FIG. 1 is a plan view of the skirtboard panel system described herein.
Figure 2:
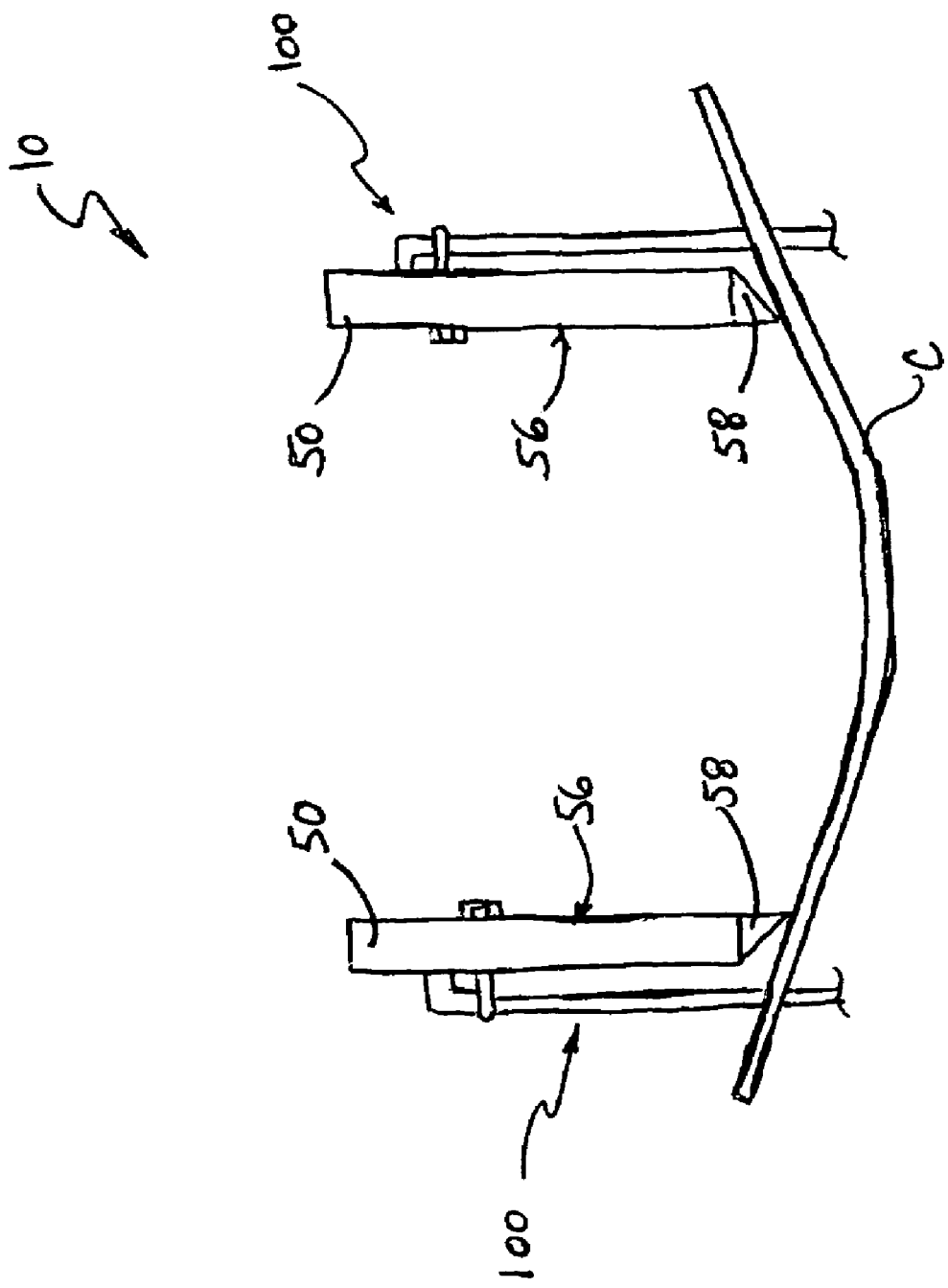
FIG. 2 is a front view of the system arranged about a belt line having a trough and inclined edges.

In one embodiment of the skirtboard system 10, the system 10 comprises at least two skirtboards 50a and 50b mutually opposed to one another and generally separated by a width or distance. As depicted in FIG. 1, the width or distance may be variable to accommodate industrial needs presented. For example, a conveyor line (or belt) may be positioned in a variety of configurations, including a substantially flat position, or having a trough with the opposing lateral sides of the belt having a sweep from the trough at a defined angle (e.g. 20 degrees; 35 degrees; 45 degrees). Depending upon the material being handled and conveyed on the belt, the width or distance between the skirtboards 50a and 50b may be adjusted accordingly. Such an adjustment is envisioned as being achieved by the mounting assemblies 100 generally known and suitable variations thereto. Likewise, vertical adjustment of the skirtboards 50a and 50b may be achieved by adjustment of the mounting assemblies 100, the interaction between the individual skirtboard and mounting assembly disclosed in greater detail below.

As depicted in FIG. 1, it is also envisioned that the system 50 may comprise a plurality of skirtboards 50a-50f, wherein skirtboards 50a, 50c and 50e are aligned on one side of the belt, and skirtboards 50b, 50d and 50f are aligned on the opposite side of the belt. Thus, skirtboard 50c is intermediately disposed and mutually adjacent to skirtboards 50a and 50e, and skirtboard 50d is intermediately disposed and mutually adjacent to skirtboards 50b and 50f. Additionally, referencing the orientation as depicted, skirtboard 50a is mutually opposed with skirtboard 50b, skirtboard 50c is mutually opposed with skirtboard 50d, and skirtboard 50e is mutually opposed with skirtboard 50f.

In accordance with each of the system embodiments disclosed above, each one of the skirtboards is similar in arrangement and configuration, and mutually opposed skirtboards (e.g. 50a and 50b) are mirror images of one another. Thus, each skirtboard (generally denoted as 50) comprises a support plate 52 arranged to form the rear of the skirtboard—the portion of the skirtboard facing away from the belt and any materials conveyed thereon. The skirtboard 50 may also comprise a plurality of elements 54 arranged along the support plate 52. Each one of the elements 54 may be mutually coupled with the support plate 52 via a variety of means, including mechanical fasteners, adhesives or other suitable means or materials. The elements 54 may be arranged in random or specific patterns. For example, the elements 54 are depicted in FIG. 3 as a plurality of vertical rows arranged in a pattern in which adjacent rows 542 and 544 are offset from one another. This pattern is repeated from end to end except at the region(s) or area(s) possessing an aperture or apertures (discussed in greater detail below). The skirtboard 50 may also comprise a liner 56 formed in interstices between the plurality of elements 54, the liner 56 formed from a material introduced into the interstices and hardening thereafter, such as various compositions of rubber or plastic, among other possible materials. The skirtboard 50 may also comprise a beveled nose 58 formed along an edge 60 (depicted as a long-edge) of the skirtboard panel. Edge 62 is mutually opposed with edge 60 and edge 64 and edge 66 are intermediately disposed between edges 60 and 62.

In accordance with each of the system embodiments disclosed above, each one of the skirtboards is similar in arrangement and configuration, and mutually opposed skirtboards (e.g. 50a and 50b) are mirror images of one another. Thus, each skirtboard (generally denoted as 50) comprises a support plate 52 arranged to form the rear of the skirtboard—the portion of the skirtboard facing away from the belt and any materials conveyed thereon. The skirtboard 50 may also comprise a plurality of elements 54 arranged along the support plate 52. Each one of the elements 54 may be mutually coupled with the support plate 52 via a variety of means, including mechanical fasteners, adhesives or other suitable means or materials. The elements 54 may be arranged in random or specific patterns. For example, the elements 54 are depicted in FIG. 3 as a plurality of vertical rows arranged in a pattern in which adjacent rows 542 and 544 are offset from one another. This pattern is repeated from end to end except at the region(s) or area(s) possessing an aperture or apertures (discussed in greater detail below). The skirtboard 50 may also comprise a liner 56 formed in interstices between the plurality of elements 54, the liner 56 formed from a material introduced into the interstices and hardening thereafter, such as various compositions of rubber or plastic, among other possible materials. The skirtboard 50 may also comprise a beveled nose 58 formed along an edge 60 (depicted as a long-edge) of the skirtboard panel. Edge 62 is mutually opposed with edge 60 and edge 64 and edge 66 are intermediately disposed between edges 60 and 62. The beveled nose 58 may be complementary to the angle of the conveyor such that a seal is formed between the beveled nose 58 and the top surface of the conveyor or belt, thereby preventing egress of materials from the conveyor or belt to beyond the skirtboard 50.

Each skirtboard panel 50 may further comprise at least one aperture 68 for receiving a mounting clamp assembly 100 utilized for mounting the skirtboard panel into position. In another embodiment, it is envisioned that each skirtboard panel 50 may further comprise a pair of apertures 68a and 68b in spaced-apart relationship, wherein each one of the apertures 68a and 68b receive a separate mounting clamp assembly 100 utilized for mounting the skirtboard panel 50 into position. In another embodiment, each skirtboard panel 50 may further comprise a first pair of apertures 68' and a second pair of apertures 68", the first pair of apertures 68' (comprising apertures 68a and 68c, respectively) are in spaced-apart relationship with the second pair of apertures 68" (comprising apertures 68b and 68d, respectively). The first pair of apertures 68' comprises a pair of apertures 68a and 68c vertically adjacent with one another, and similarly, the second pair of apertures 68" comprising a pair of apertures 68b and 68d vertically adjacent with one another. The inclusion of apertures 68' and 68" allows for an increase in attachment points about each skirtboard panel 50 and permits greater variability in vertical height and positioning.

It is envisioned that the support plate 52 may comprise a sturdy and durable material, including semi-rigid and rigid materials. For example, it is envisioned that the support plate 52 may be fabricated from hardened or reinforced plastic, or other suitable polymers, or metals, such as steel. The support plate 52 provides a supportive backbone to the components attached or coupled to the plate 52, and also provides support and resistance to the bulk materials carried on the conveyor.

It is envisioned that each one of the plurality of elements 54 comprises abrasion-resistant material. It is envisioned that each one of the plurality of elements comprises the general class of ceramic materials, including any suitable carbides, nitrides, silicides and borides. For example, porcelain and tungsten carbide are envisioned as suitable materials for fabricating the elements 54. It is also envisioned that the elements 54 may comprise a variety of shapes or forms, including a cylindrical shape, a conical shape, or another shape similar thereto. It is envisioned that the profile of the liner 56 may comprise a greater depth than the profile of the elements 54.

The beveled nose 58 may comprise a ceramic material, or a material substantially similar to or complementary to the material used for the elements 54. As depicted in FIG. 5, the beveled nose 58 is triangular in shape with a leading edge 582 generally co-extensive with the frontal plane of the skirtboard panel 50 (the frontal plane faces the conveyor belt and the materials thereon). The beveled nose 58 further includes a trailing edge 584 arranged or configured at an angle complementary to the angle of the conveyor belt. A radius 583 may be intermediately disposed between the leading edge 582 and the trailing edge 584 to soften the contact that may occur between the beveled nose 58 and the conveyor belt, or between the beveled nose 58 and any materials carried on the conveyor belt. The beveled nose 58 also includes a top edge 586 intermediately disposed between edge 582 and edge 584 along the side opposite the radius.

The liner 56 may comprise a rubber material or a material similar thereto. In combination with the ceramic material used for the elements 54, the elements 54 and liner 56 cooperatively support one another. Elements 54 provide increased strength to the liner 56, while also encouraging fracturing of the liner 56 in portions typically much smaller than is normally found with unsupported rubber wear-liners. In combination with the elements 54 and liner 56 as described above, a beveled nose 58 (in accordance with the description of the nose 58 above) positioned along the bottom edge of the skirtboard panel 50 provides further enhancements to the structural integrity of the skirtboard panel 50. For example, the ceramic material of the nose 58 inhibits the frictional wear and erosion on the lower edge of the skirtboard panel 50 that typically results. By inhibiting the frictional wear, the elements 54 and liner 56 are further supported. Thus, elements 54, liner 56 and nose 58 work cooperatively to strengthen each component, preventing early exhaustion and obviating the need for frequent repair or replacement of the components and/or the individual skirtboard panel 50.

A method for forming an individual skirtboard panel 50 includes the steps of forming at least one aperture 68 in a support plate 52, coupling a plurality of elements 54 with the support plate 52, and forming a liner 56 in the interstices between the plurality of elements 54. The method further includes coupling a beveled nose 58 to an edge of the liner 56.

The support plate 52 may be fabricated from a sturdy material, such as plastic, reinforced plastic, or metal. The support plate 52 may comprise most or all of the rear of the skirtboard panel 50, though it is depicted in one view (FIG. 4) as comprising approximately 70% of the rear of the panel 50. The thickness of the support plate 52 may vary according to size of the conveyor line and/or the materials that are handled by the conveyor line. It is envisioned that an acceptable thickness may be achieved in the range of 3/16 and 7/16", although variations on either side are envisioned and considered acceptable as well.

The support plate 52 and the plurality of elements 54 may be coupled by a variety of means, including mechanical fasteners and/or adhesive(s) material(s). It is envisioned that the use of adhesive material may be the more efficient form of fabricating the components, wherein a layer of adhesive may be set down on the interior surface of the support plate 52 and the plurality elements 54 set onto or engaged with the adhesive and surface of the plate 52. The addition of an adhesive layer may enhance the binding of the material used for forming the liner 56 thereafter, although it is not required or absolutely necessary.

The liner 56 may be formed by injecting material into a mold that corresponds with the arrangement of the elements 54 as secured to the plate, or by injecting material into the interstices between the elements 54 once the elements 54 are secured to the plate 52. In either method, the material (e.g. rubber) is injected so that holes or channels for housing the elements 54 are formed. Thus, once arranged, the elements 54 are housed within the holes or channels formed in the liner 56. As noted previously, this configuration and arrangement allows the elements 54 and the liner 56 to provide mutual support to one another, and to take advantage of the additional support provided by plate 52 and nose 58, respectively.

Likewise, and similar to the coupling of elements 54 to plate 52, the beveled nose 58 may be coupled to the lower edge of the panel 50 via mechanical fasteners and/or adhesive material. In some instances, the lower edge of the panel 50 may comprise a margin of liner 56 formed from the rubber material (for example). With mechanical fasteners, the nose 58 may require ports or holes through which a fastener may be inserted. It is envisioned that adhesive may be more advantageous for coupling the nose 58 and liner 56.

It is to be understood that the embodiments and claims are not limited in its application to the details of construction and arrangement of the components set forth in the description and illustrated in the drawings. Rather, the description and the drawings provide examples of the embodiments envisioned, but the claims are not limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claimed appended hereto.

What is claimed is:

1. A skirtboard panel for a conveyor, the skirtboard comprising:
   a support plate;
   a plurality of elements, each one of the elements mutually coupled with the support plate so as to create interstices between said plurality of elements;
   a liner formed in said interstices between the plurality of elements; and
   a beveled nose forming an edge of the skirtboard panel, the beveled nose complementary to the angle of the conveyor.

2. The skirtboard panel of claim 1, wherein the support panel comprises a rigid material.

3. The skirtboard panel of claim 1, wherein each one of the plurality of elements comprises abrasion-resistant material.

4. The skirtboard panel of claim 3, wherein each one of the plurality of elements comprises a ceramic material.

5. The skirtboard panel of claim 1, wherein the liner comprises a rubber material.

6. The skirtboard panel of claim 1, wherein the profile of the liner comprises a greater depth than the profile of the elements.

7. The skirtboard panel of claim 1, wherein the beveled nose comprises a ceramic material.

8. The skirtboard panel of claim 1 further comprising at least one aperture through said support plate and said liner for mounting the skirtboard panel into position.

9. The skirtboard panel of claim 1 further comprising a pair of apertures in spaced-apart relationship through said support plate and said liner for mounting the skirtboard panel into position.

10. The skirtboard panel of claim 1 further comprising a first pair of apertures and a second pair of apertures, the first pair of apertures in spaced-apart relationship with the second pair of apertures, the first pair of apertures comprising a pair of apertures vertically adjacent, the second pair of apertures comprising a pair of apertures vertically adjacent.

11. A skirtboard system for a conveyor, the system comprising:
    at least two skirtboards mutually opposed to one another, each one of the skirtboards positioned near the perimeter of the conveyor;
    each one of the skirtboards comprising:
      a support plate;
      a plurality of elements, each one of the elements mutually coupled with the support plate so as to create interstices between said plurality of elements;
      a liner formed in said interstices between the plurality of elements; and
      a beveled nose forming an edge of the skirtboard panel, the beveled nose complementary to the angle of the conveyor.

12. The skirtboard system of claim 11 wherein the support plate comprises a rigid material.

13. The skirtboard system of claim 11, wherein each one of the plurality of elements comprises abrasion-resistant material.

14. The skirtboard system of claim 13, wherein each one of the plurality of elements comprises a ceramic material.

15. The skirtboard system of claim 11, wherein the liner comprises a rubber material.

16. The skirtboard system of claim 11, wherein the profile of the liner comprises a greater depth that the profile of the elements.

17. The skirtboard system of claim 11, wherein the beveled nose comprises a ceramic material.

18. The skirtboard system of claim 11 further comprising at least one aperture through said support plate and said liner of said at least two skirtboards for mounting said at least two skirtboards into position.

19. A method for making a skirtboard panel, the method comprising the steps of:
    coupling a plurality of elements to a support plate, leaving interstices between the plurality of elements, and then forming a liner in the interstices between the plurality of elements;
    and coupling a beveled nose to an edge of the liner,
    said support plate having at least one aperture.

* * * * *